(12) United States Patent
Akamatsu et al.

(10) Patent No.: US 7,345,580 B2
(45) Date of Patent: Mar. 18, 2008

(54) ALARM MANAGEMENT SYSTEM

(75) Inventors: Nobuo Akamatsu, Musashino (JP);
Taisuke Ishida, Musashino (JP);
Nobuhiro Niina, Musashino (JP);
Yasunori Kobayashi, Musashino (JP)

(73) Assignee: Yokogawa Electric Corporation,
Musashino-shi, Tokyo (JP)

( * ) Notice: Subject to any disclaimer, the term of this patent is extended or adjusted under 35 U.S.C. 154(b) by 383 days.

(21) Appl. No.: 10/879,400

(22) Filed: Jun. 30, 2004

(65) Prior Publication Data

US 2005/0062598 A1 Mar. 24, 2005

(30) Foreign Application Priority Data

Sep. 5, 2003 (JP) ............................. 2003-313559

(51) Int. Cl.
*G08B 29/00* (2006.01)

(52) U.S. Cl. ...................... 340/506; 340/517; 340/525; 700/80

(58) Field of Classification Search ................ 340/506, 340/500, 517, 525, 521; 709/318; 702/183–185, 702/187, 188; 700/17, 83, 11, 12, 21, 80
See application file for complete search history.

(56) References Cited

U.S. PATENT DOCUMENTS

| 4,339,746 A | * | 7/1982 | Ulicki et al. ................. 340/518 |
| 5,428,555 A | * | 6/1995 | Starkey et al. ............... 700/275 |
| 7,113,085 B2 | * | 9/2006 | Havekost ..................... 340/506 |
| 2002/0075153 A1 | * | 6/2002 | Dahl ........................ 340/573.1 |

OTHER PUBLICATIONS

General Specifications, GS 36J06A10-01E, NTPS100, Exaplog Event Analysis Package, pp. 1-8, Jun. 16, 2003.

* cited by examiner

*Primary Examiner*—Anh V. La
(74) *Attorney, Agent, or Firm*—Westerman, Hattori, Daniels & Adrian, LLP.

(57) ABSTRACT

The present invention relates to an alarm management system for acquiring message data for alarms issued from a process and analyzing alarm behaviors. The alarm management system of the present invention selects unnecessary alarms from the message data for alarms and prevents alarms from being issued according to the results of alarm selection. Consequently, the system eliminates the need for engineers who have professional skills and experience, thereby making it possible to precisely select unnecessary alarms.

20 Claims, 17 Drawing Sheets

ALARM MANAGEMENT SYSTEM

BACKGROUND OF THE INVENTION

1. Field of the Invention

The present invention relates to an alarm management system for acquiring message data for alarms issued from a process and analyzing alarm behaviors.

2. Description of the Prior Art

Prior art documents related to an event analysis system that acquires and analyzes message data for alarm events, for example, produced from a process include the following.

[Non-patent document 1]

URL: http://www.yokogawa.co.jp/EXASOFT/13_Exalog/exalog_01.htm

Exaplog event analysis package

FIG. 1 is a function block diagram illustrating the configuration of an alarm management system disclosed in the GS36J06A10-01 general specifications document downloadable from the web page where non-patent document 1 is placed. The server acquires produced alarm messages (with process data at the moment each message was produced) from the historical message file, which is a log of plant operations kept by the distributed process control system (DCS), and stores them.

The processing functions of the alarm management system include:

(1) outputting the saved data to the display or printing or referencing the data;
(2) examining the cause of alarm issuance and the necessity of such alarms using an analysis tool (quantification using trend graphs or classification using pie charts and tables);
(3) correcting the cause of unnecessary alarms being issued in order to prevent the alarms from being inadvertently reissued; and
(4) modifying the alarm functions, rather than using function (3) above, in order to temporarily prevent the unnecessary alarms from being issued.

Alarms issued from a process include those attributable to alarm setpoints, tag ranges or control parameters that were incorrectly defined in an engineering phase. There is therefore the need for suppressing such alarms among those included in the appropriate population of alarms under alarm data analysis.

When reviewing unnecessary alarms using a conventional alarm management system, the assigned engineer must identify such unnecessary alarms from among as many as several thousand or several ten thousand alarms. Then the engineer must identify the causes (for example, incorrect tag ranges) of these alarms and correct them one by one, incurring enormous amounts of engineering man-hours. This work has been extremely troublesome for engineers who face labor-saving staff cutbacks.

In order to identify unnecessary alarms, engineers having appropriate professional skills and experience are needed. Often, however, it is impossible to secure the appropriate personnel, making it difficult to precisely select unnecessary alarms.

SUMMARY OF THE INVENTION

An object of the present invention, therefore, is to provide an alarm management system having the functions to automatically identify and suppress unnecessary alarms.

DETAILED DESCRIPTION OF THE PREFERRED EMBODIMENTS

Figure 1:
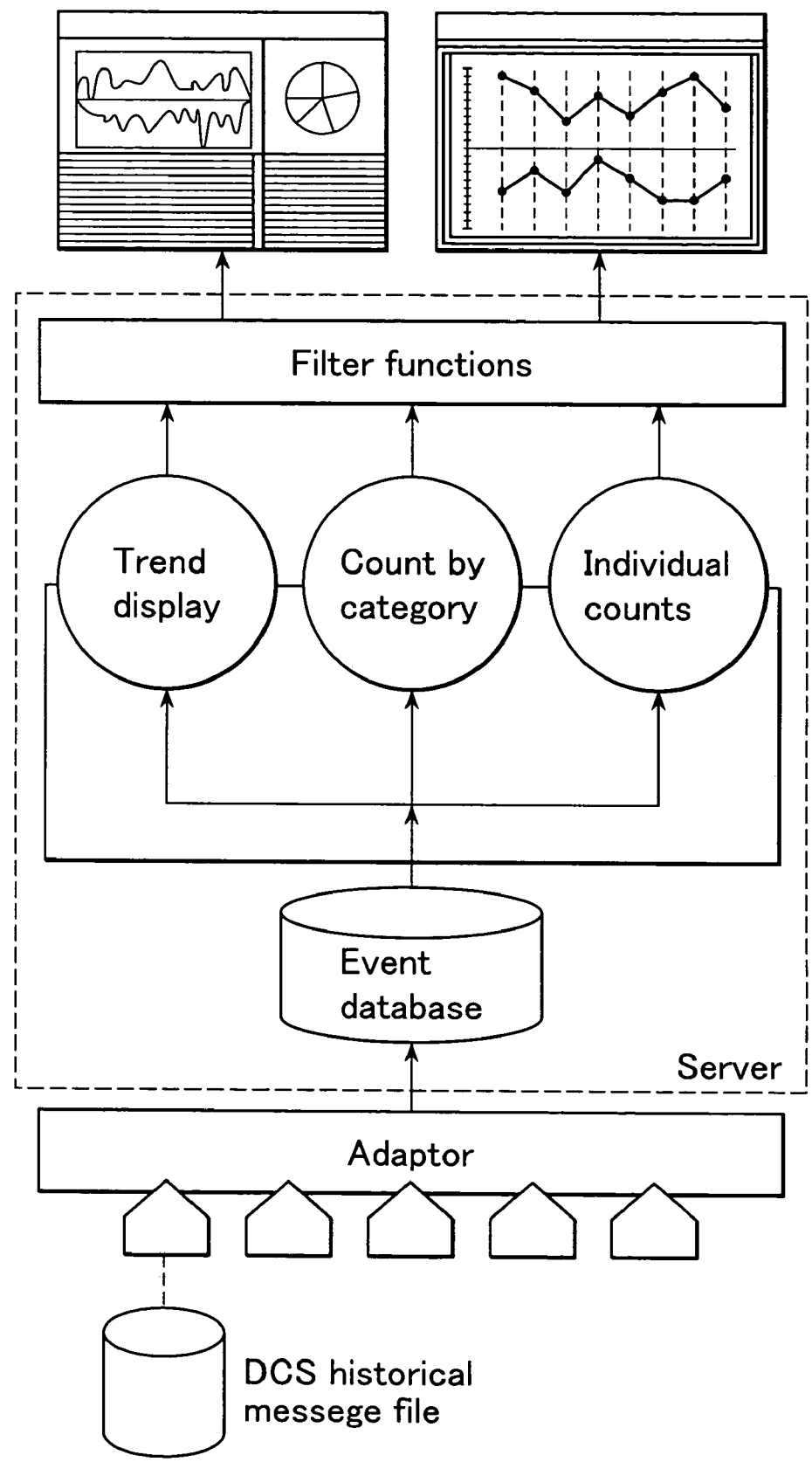
FIG. 1 is a functional block diagram illustrating the configuration of a conventional alarm management system.
Figure 2:
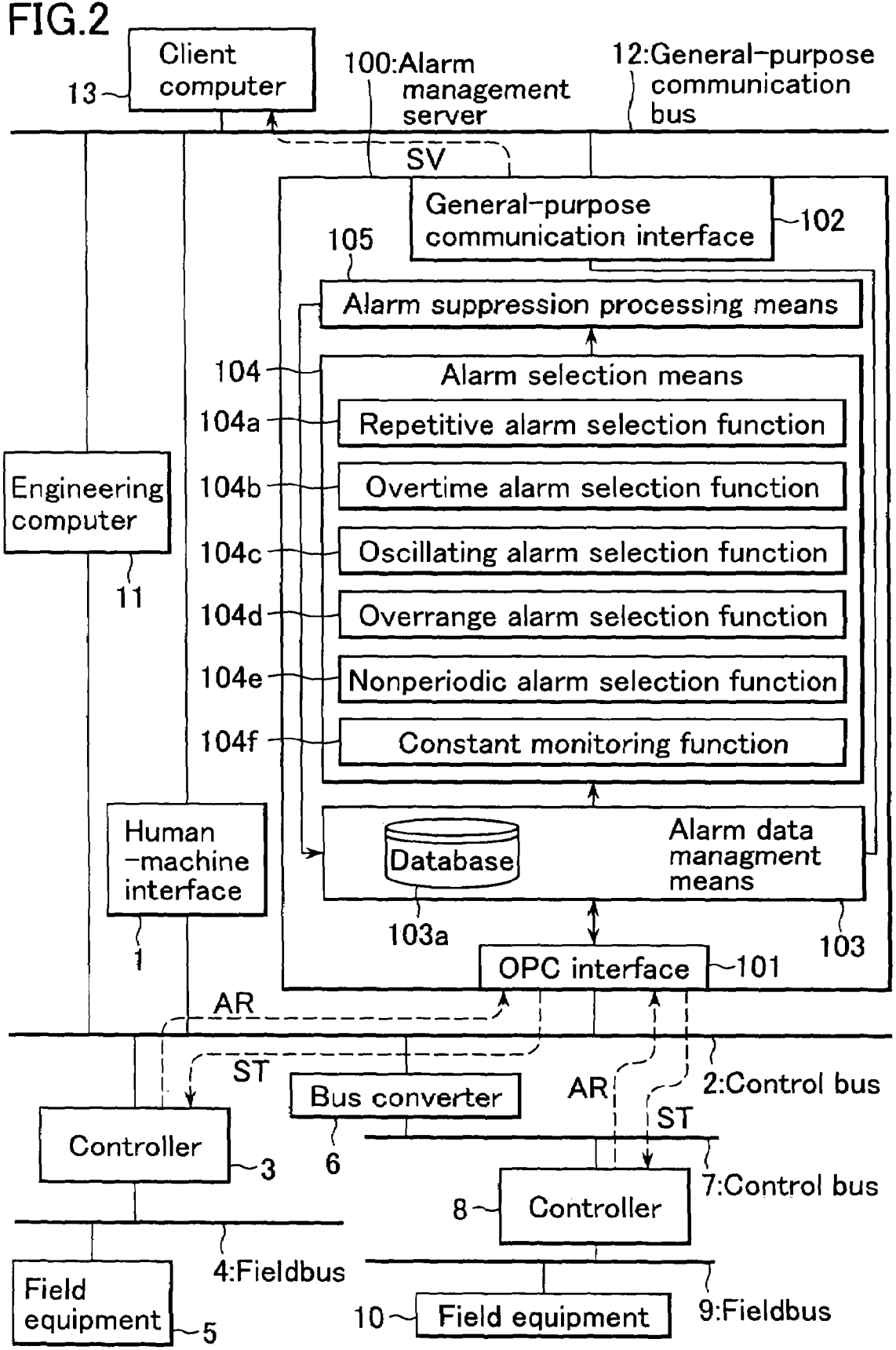
FIG. 2 is a functional block diagram illustrating one embodiment of a hierarchical process control system to which the alarm management system in accordance with the present invention has been applied.

The present invention will now be described in detail with reference to the accompanying drawings. FIG. 2 is a functional block diagram illustrating one embodiment of a hierarchical process control system to which the alarm management system in accordance with the present invention has been applied.

In FIG. 2, numeral 1 denotes a human-machine interface that hosts the hierarchical process control system and is connected to control bus 2. Numeral 3 denotes a controller, which is also connected to control bus 2 to communicate with human-machine interface 1 and with field equipment 5 connected to this fieldbus through fieldbus 4, and controls the field equipment by executing given application programs.

Numeral 6 denotes a bus converter that relays signals between control bus 2 and control bus 7 compliant with a standard different from that of control bus 2. Numeral 8 denotes a controller connected to control bus 7. This controller communicates with human-machine interface 1 through bus converter 6 and control bus 2 and with field equipment 10 through fieldbus 9 to which the field equipment is connected, and controls the field equipment by executing given application programs.

Numeral 11 denotes an engineering computer that is connected to control bus 2 and generates and downloads application programs to be run on human-machine interface 1 and controllers 3 and 8. Alarm setpoints, tag ranges and control parameters, which can cause unnecessary alarms to be issued, are also generated by this engineering computer.

Numeral 12 denotes a general-purpose communication bus such as Ethernet (registered trademark) and client computer 13 that uses process data such as, for example, production control information is connected to this communication bus. Human-machine interface 1 and engineering computer 11 are also connected to this general-purpose communication bus and have been made ready to communicate with client computer 13.

The constituent elements discussed above are generic constituent elements that a hierarchical process control system comprises. Block 100 is an alarm management server that constitutes the principal part of the present invention. Alarm management server 100 is connected to control bus 2 through OPC interface 101 compliant with the OPC (OLE for Process Control) Foundation standard drawn up as a common interface for referencing process data. The server is also connected to general-purpose communication bus 12 through general-purpose communication interface 102.

Numeral 103 denotes alarm data management means, which has database 103a. This alarm data management means has the following functions.

(1) Acquires the alarm message data AR generated at controllers 3 and 8 through OPC interface 101 and control bus 2 and stores the data in database 103a.
(2) Selects/starts/stops the sub-modules of alarm selection means and alarm suppression processing means discussed later, by means of alarm detection. Note that the slash (/) is used here to mean 'or'.
(3) Registers previously identified process unit tags not included in the selection of unnecessary alarms in database 103a, and determines and precludes alarms not included in the selection from detected alarms.
(4) Maintains records of alarm suppression processing (output of various messages, processing for changing and reverting the alarm setpoints, and processing for turning alarms off and back on) in database 103a, and notifies controllers 3 and 8 of the settling information ST.

Numeral 104 denotes alarm selection means for selecting unnecessary alarms on a pattern-by-pattern basis. Numeral 105 denotes alarm suppression processing means, which determines a type of suppression processing to be applied according to the pattern of a selected unnecessary alarm, and transfers the results of such determination to alarm data management means 103.

In alarm selection means 104, symbol 104a denotes a repetitive alarm selection function. This function selects repetitive alarms in which the result of judging a process variable is that a high-low-high (HI-LO-HI) pattern of change or a low-normal-low (LO-NR-LO) pattern of change is generated a specified number of times within a specified period.

Alarm suppression processing means 105 executes suppression processing for automatically increasing or decreasing the setpoints of these alarms by certain quantities when the aforementioned repetitive alarms are selected, and causes a message requesting to review the alarm setpoints to be output. Furthermore, the alarm suppression processing means executes processing for canceling suppression processing if the means concludes, as the result of continued monitoring after suppression processing, that repetitive alarms are no longer issued.

In alarm selection means 104, symbol 104b denotes an overtime alarm selection function. This function selects overtime alarms in which the result of judging a process variable is that a high (HI) or low (LO) state lasts longer than a specified time.

When an overtime alarm is selected, alarm suppression processing means 105 executes suppression processing for temporarily changing the setpoint of the alarm to a value that causes the process variable to become normal, as well as processing for causing a message requesting to review a hysteresis setpoint to be output.

In alarm selection means 104, symbol 104c denotes an oscillating alarm selection function. This function selects oscillating alarms in which the result of judging a process variable is that a high-low-high-low (HI-LO-HI-LO) pattern of change is generated a specified number of times within a specified period.

When an oscillating alarm is selected, alarm suppression processing means 105 executes suppression processing for forcibly turning off the oscillating alarm, as well as processing for causing a message requesting to review the control parameter of a relevant tag to be output. Furthermore, the alarm suppression processing means executes processing for canceling suppression processing if the means concludes, as the result of continued monitoring after suppression processing, that oscillating alarms are no longer issued.

In alarm selection means 104, symbol 104d denotes an overrange alarm selection function. This function selects overrange alarms issued if a process variable increases or decreases beyond the range thereof.

When an overrange alarm is selected, alarm suppression processing means 105 executes suppression processing for forcibly turning off the overrange alarm, as well as processing for causing a message requesting to review the range of a relevant tag to be output.

In alarm selection means 104, symbol 104e denotes a nonperiodic alarm selection function. This function selects nonperiodic alarms issued if a process variable increases or decreases beyond the range thereof due to a temporary transmitter failure or disconnection.

When a nonperiodic alarm is selected, alarm suppression processing means 105 executes suppression processing for forcibly turning off the nonperiodic alarm, as well as processing for causing a message requesting to perform transmitter maintenance for a relevant tag to be output.

Alarm suppression processing means 105 passes the tag, which has overranged and issued an alarm, to alarm data management means 103 and lets the tag to be constantly monitored registered and listed in database 103a.

In alarm selection means 104, symbol 104f denotes a constant monitoring function. This function periodically monitors the behaviors of process variables of the tags listed due to overranging. If the function confirms that overranging has actually occurred, the function suppresses IOP alarms and outputs a message. The listed tags are deleted manually.

Alarm suppression processing means 105 passes all of the contents of suppression processing and message outputs to alarm management means 103 to let the means keep the contents on file as records. Likewise, this alarm suppression processing means passes the contents of processing for changing alarm setpoints and turning alarms off and back on and the contents of message output to alarm data management means 103 to let the means keep them on file as records.

The results of alarm selection by alarm selection means 104 and the contents of suppression processing by alarm suppression processing means 105 are passed as the management information SV to client computer 13 connected through general-purpose communication bus 12 and are utilized as alarm analysis data.

Alarm data management means 103 makes a non-target process unit tag judgment when any new tag with alarm is accepted. If the tag does not fall under the category of non-target process unit tags, it is regarded as being subject to a judgment of unnecessary alarms. In response, the selection functions labeled 104a to 104e start this judgment with their sub-modules based on specified algorithms started up.

Furthermore, each of the selection functions labeled 104a to 104e is provided with a plurality of sub-modules so that concurrent judgment is feasible. It should be noted that for constant monitoring function 104f, a sub-module to enter previously listed tags, rather than newly issued alarms, is periodically started up.

Now behavioral examples of alarm data management means 103, selection functions 104a to 104e of alarm selection means 104, and alarm suppression processing means 105 are described below for each pattern of unnecessary alarms, by referring to the software processing based functional flowcharts and waveform flowcharts shown in FIGS. 3 to FIG. 17.

Figure 3:
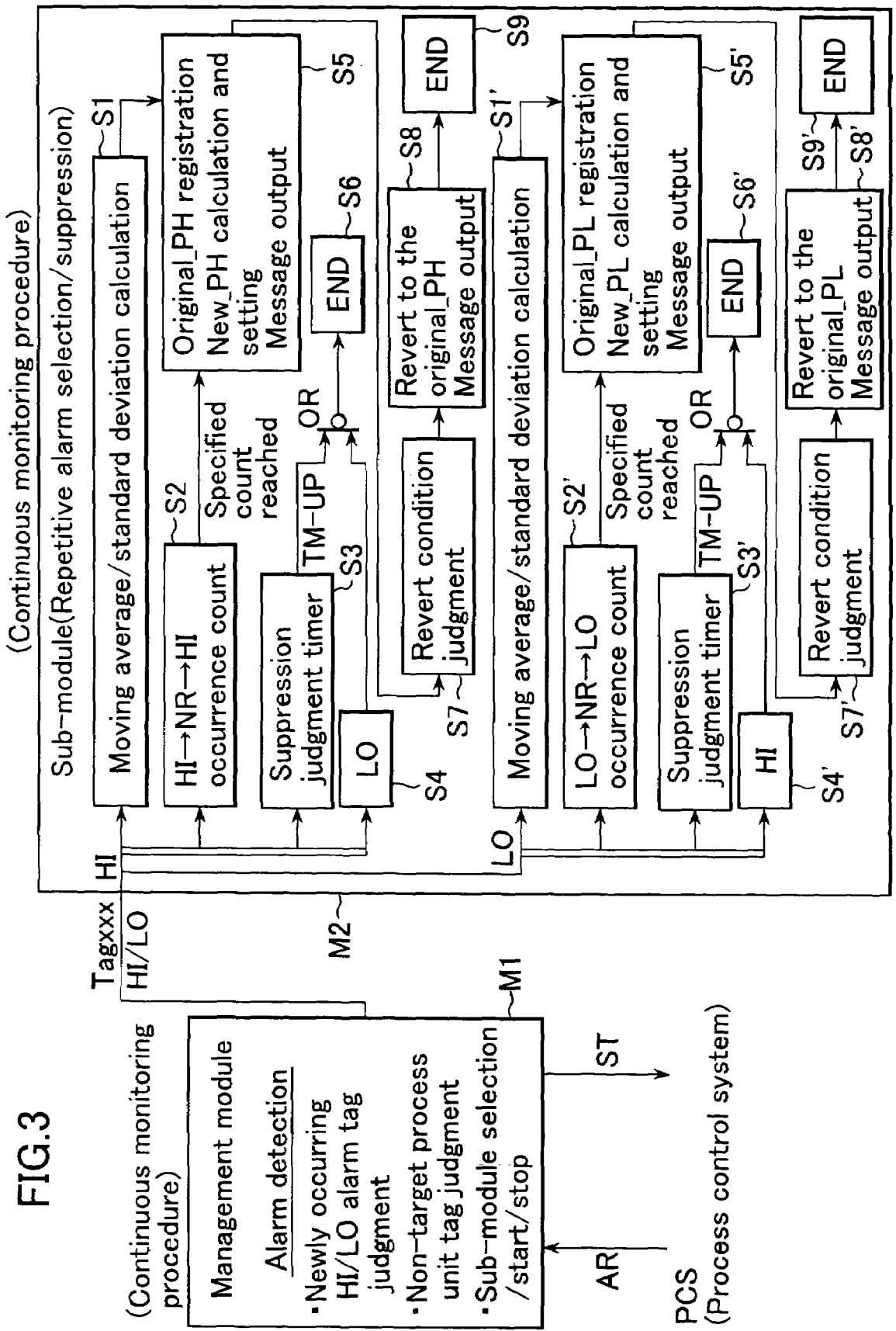
FIG. 3 is a functional flowchart illustrating a process of selecting and suppressing repetitive alarms.

FIG. 3 is the functional flowchart of modules for selecting and suppressing repetitive alarms. Symbol M1 denotes a management module, which is a function executed within alarm data management means 103. Upon detection of alarms, management module M1 makes a judgment of tags with newly issued high (hereinafter represented by HI) alarms or low (hereinafter represented by LO) alarms, as well as a non-target process unit tag judgment, and selects/starts/stops sub-module M2.

Sub-module M2 is a function executed within repetitive alarm selection function 104a and alarm suppression processing means 105. The purpose of this function is to prevent any HI (or LO) alarm from recurring uselessly as a gently-changing process variable (hereinafter represented by PV) remains at a level near the HI (or LO)-alarm setpoint.

The algorithm of suppression judgment watches for suppression conditions from the moment a HI (or LO) alarm is issued. This algorithm concludes the alarm to be an unnecessary alarm of repetitive type if a normal (hereinafter represented by NR)-to-HI (or LO) pattern of change repeats a specified number of times within a specified suppression judgment period.

In suppression processing for a tag whose alarm has been concluded to be unnecessary, sub-module M2 temporarily changes SH/SL to values at which the NR-to-HI (or LO) pattern of change will not be repeated, judging from the moving average, standard deviation, high-limit setpoint (hereinafter represented by PH) and low-limit setpoint (hereinafter represented by PL) of PV. In addition, the sub-module causes a message to be output.

Now assume that Original_PH is an original PH, Original_PL is an original PL, New_PH is PH for temporarily avoiding repetition, Mean is the moving average of PV, Dev is the standard deviation of PV, SH is a HI limit of the scale, SL is a LO limit of the scale, and COEF is a variable constant. Then, the manipulation to change PH against HI alarms must satisfy $|3*Dev| \geq |Original\_PH-Mean|$ and $New\_PH=Mean-3*Dev$, if Mean$-3*Dev \geq Original\_PL+0.1*(SH-SL)$, or $New\_PH=Mean-COEF*Dev$, if Mean$-3*Dev < Original\_PL+0.1*(SH-SL)$.

Also for LO alarms, a similar algorithm is used to change PL.

Figure 4:
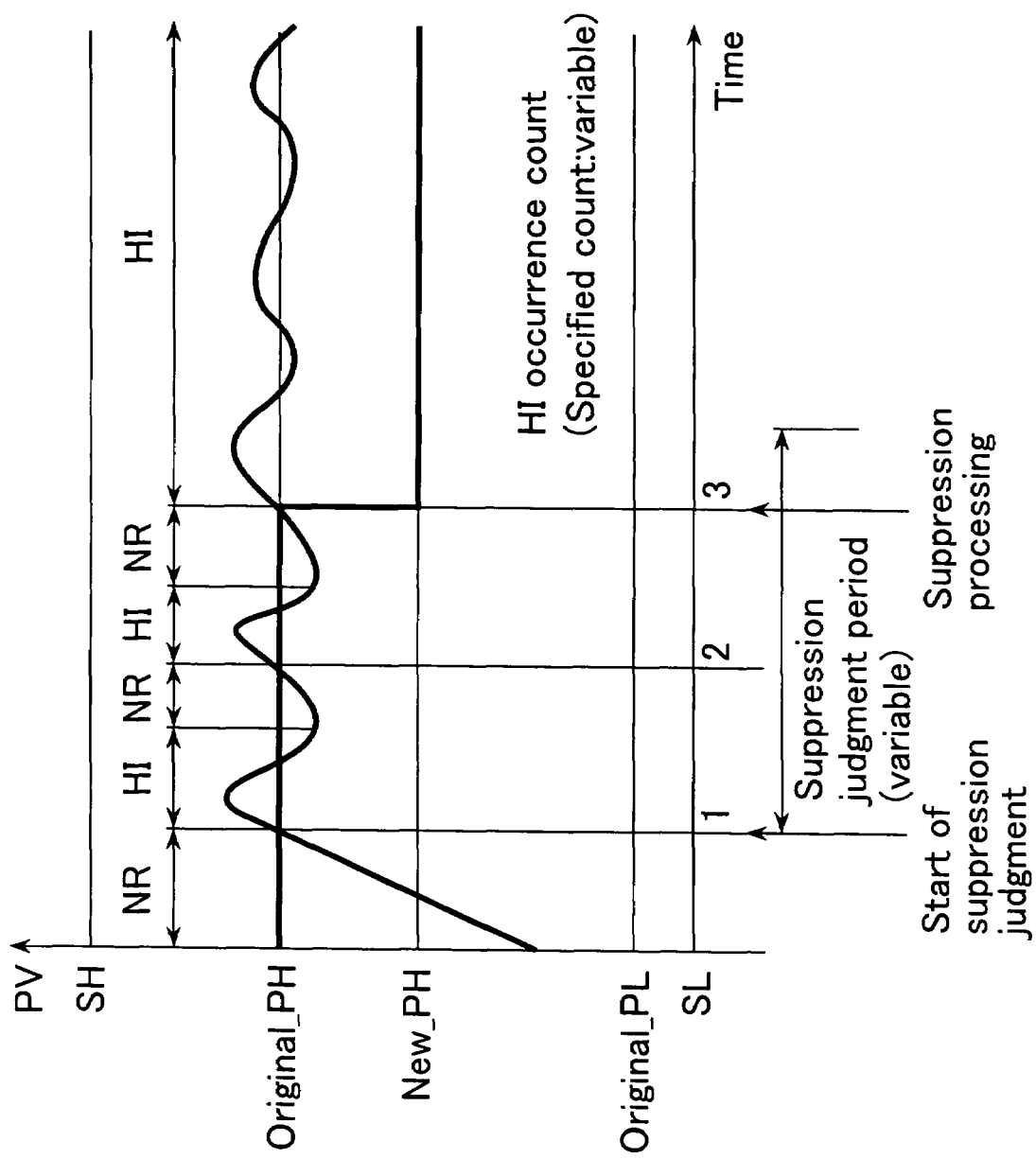
FIG. 4 is a waveform chart illustrating system behaviors according to the functional flowchart of FIG. 3.

The waveform chart of FIG. 4 illustrates the aforementioned method of change manipulation against HI alarms. In FIG. 4, a manipulation is performed to decrease Original_PH to New_PH since PV remains at a level near Original_PH and the aforementioned pattern of change has occurred a specified number of times (three times in the figure) within the suppression judgment period.

Referring back to FIG. 3, the functional flowchart of sub-module M2 is explained. Upon receipt of a HI alarm from management module M1, sub-module M2 starts concurrent processing comprising steps S1 to S4. Step S1 calculates the moving average and standard deviation of PV. Step S2 counts the repetitions of the HI-NR-HI pattern of change. If a specified number of repetitions is reached, sub-module M2 notifies step S5 accordingly.

Step S3 is a suppression judgment timer, which sends a TM-UP output to step S6 through the OR gate when a preset time expires, and ends processing. Step S4 detects that the HI alarm has changed to a LO alarm and notifies step S6 accordingly through the OR gate, and ends processing.

If no LO alarm occurs during the judgment period of suppression judgment timer S3 and the specified occurrence count is reached, the HI alarm is concluded to be an unnecessary alarm. Consequently, Original_PH is saved, New_PH is calculated and set, and a message is output in step S5, and sub-module M2 moves to step S7.

In step S7, a judgment of suppression cancellation conditions is made using the algorithm discussed later. If the conditions are satisfied, sub-module M2 reverts New_PH to Original_PH and outputs a message in step S8 and ends processing at step S9.

The functional flow when a LO alarm is received from management module M1 is described as steps S1' to S9'. This functional flow corresponds to, and is functionally identical with, the above-discussed functional flow comprising steps S1 to S9 for HI alarms and is, therefore, not explained here.

Figure 5:
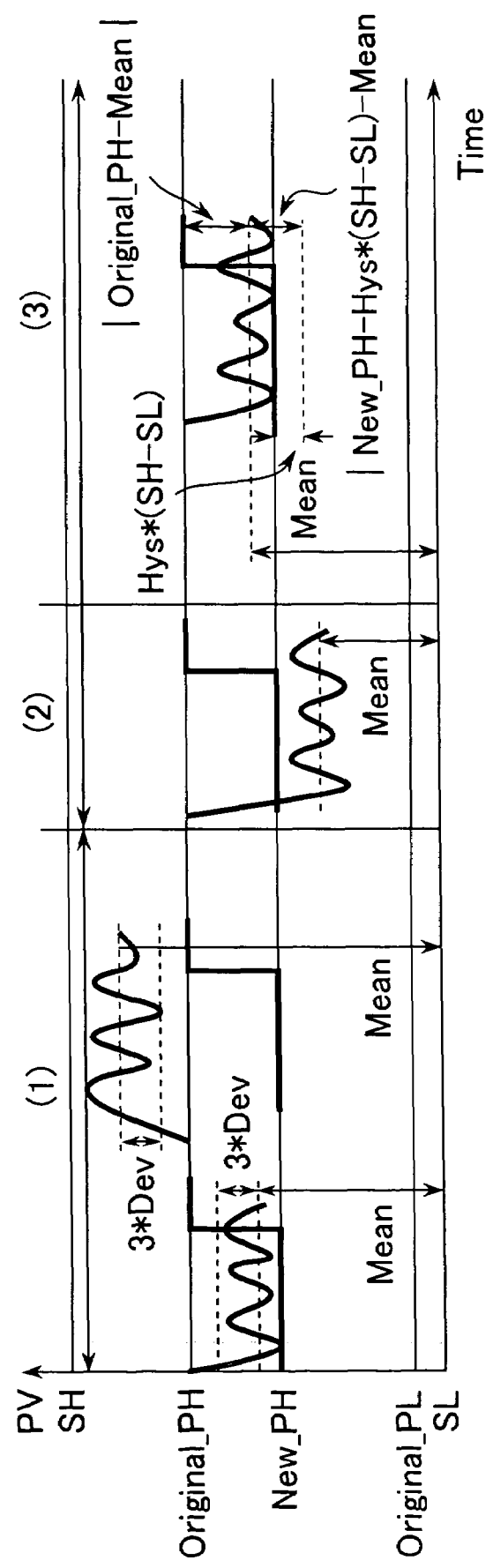
FIG. 5 is another waveform chart illustrating system behaviors according to the functional flowchart of FIG. 3.

FIG. 5 is a waveform chart explaining the way suppression cancellation conditions are judged in step S7 for HI alarms and shows three patterns of change as marked (1), (2) and (3). Suppression cancellation conditions for reverting New_PH to Original_PH will be explained by applying the case "PV remains in a NR state" or the case "HI alarms remain unissued" to each of patterns (1), (2) and (3) in FIG. 5.

Assume that Hys is the hysteresis of PH (a variable constant common to all tags).

(1) The band of PV is out of Original_PH. →Suppression is cancelled if Mean+3*Dev<Original_PH or Original_PH<Mean−3*Dev is satisfied, and New_PH is reverted to Original_PH.

(2) Suppression is cancelled if New_PH≧Mean is satisfied, and New_PH is reverted to Original_PH.

(3) The difference between Mean and Original_PH is greater than that between Mean and "New_PH−Hys". →Suppression is cancelled if |Original_PH−Mean|≧|New_PH−Hys*(SH−SL)−Mean| is satisfied, and New_PH is reverted to Original_PH.

These judgment algorithms also apply to LO alarms.

Figure 6:
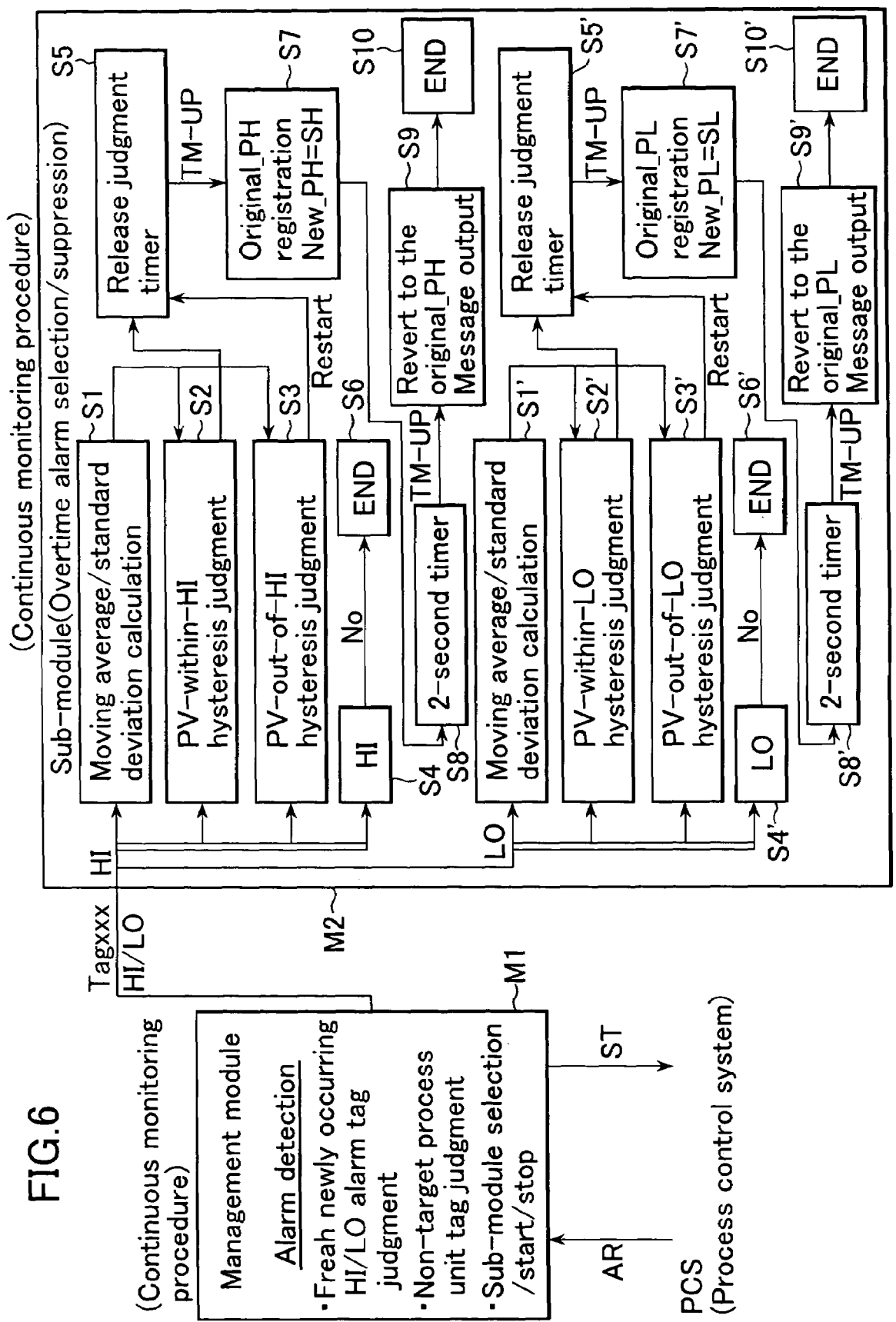
FIG. 6 is a functional flowchart illustrating a process of selecting and suppressing overtime alarms.

FIG. 6 is the functional flowchart of modules for selecting and suppressing overtime alarms. Symbol M1 denotes a management module, which is a function executed within alarm data management means 103. Upon detection of alarms, management module M1 makes a judgment of tags with newly issued HI or LO alarms, as well as a non-target process unit tag judgment, and selects/starts/stops sub-module M2.

Sub-module M2 is a function executed within overtime alarm selection function 104b and alarm suppression means 105. The purpose of this function is to cancel HI (or LO) alarms if PV remains within the hysteresis of PV for a prolonged time because the hysteresis of HI (or LO) alarms is not correctly set.

Suppression judgment means to verify that PV remains within the hysteresis range of HI (or LO) alarms for a given period. Cancellation processing comprises the steps of temporarily changing PH (or PL) to a value that causes PV to go into a NR state, immediately reverting PH (or PL) to the original value thereof to cancel the HI (or LO) alarms, and causing a message to be output.

The conditions for changing PH against HI alarms are: that the HI alarm remains active during the cancellation judgment period, and that Mean+3*Dev<Original_PH holds true. As cancellation processing, sub-module M2 makes New_PH=SH hold true for two seconds, then reverts New_PH to Original_PH, and causes a message requesting to review the hysteresis setpoint to be output.

Figure 7:
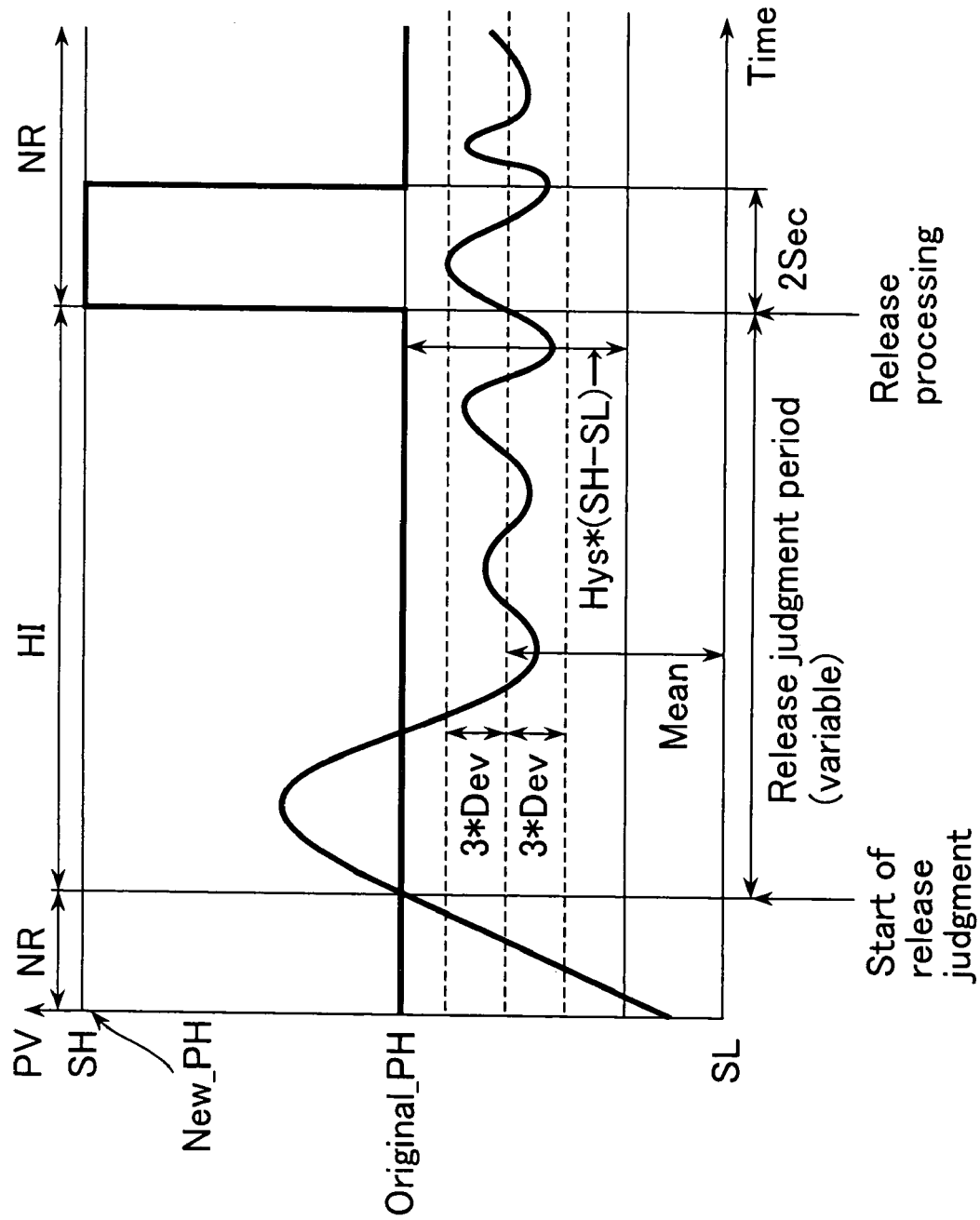
FIG. 7 is a waveform chart illustrating system behaviors according to the functional flowchart of FIG. 6.

The waveform chart of FIG. 7 illustrates the method of the aforementioned change manipulation against HI alarms. If PV is judged to have remained within the hysteresis of HI alarms beyond the cancellation judgment period, sub-module M2 temporarily changes Original_PH to New_PH shifted up to SH for a duration of two seconds and reverts New_PH back to Original_PH, thereby forcibly canceling the HI alarms.

Referring back to FIG. 6, the functional flowchart of sub-module M2 is explained. Upon receipt of a HI alarm from management module M1, the functions of steps S1 to S4 start concurrent processing. Step S1 calculates the moving average and standard deviation of PV.

A PV-within-hysteresis judgment is made in step S2 and a PV-out-of-hysteresis judgment is made in step S3. For the PV-within-hysteresis judgment, sub-module M2 starts the cancellation judgment timer of step S5; for the PV-out-of-hysteresis judgment, sub-module M2 restarts the cancellation judgment timer.

In step S4, a Yes/No check is made on the HI alarm. If "No", sub-module M2 ends processing at step S6. The timeout output TM-UP of the cancellation judgment timer in step S5 is sent to step S7, in which Original_PH is saved and the manipulation to change New_PH to SH is performed.

After this change manipulation, the 2-sec timer of step 8 is started. When the timeout output TM-UP is sent to step S9, sub-module M2 performs the manipulation to revert New_PH to Original_PH and outputs a message. Then the module ends processing at step S10.

The functional flow when a LO alarm is received from management module M1 is described as steps S1' to S10'.

This functional flow corresponds to, and is functionally identical with, the above-discussed functional flow comprising steps S1 to S10 for HI alarms and is, therefore, not explained here.

Figure 8:
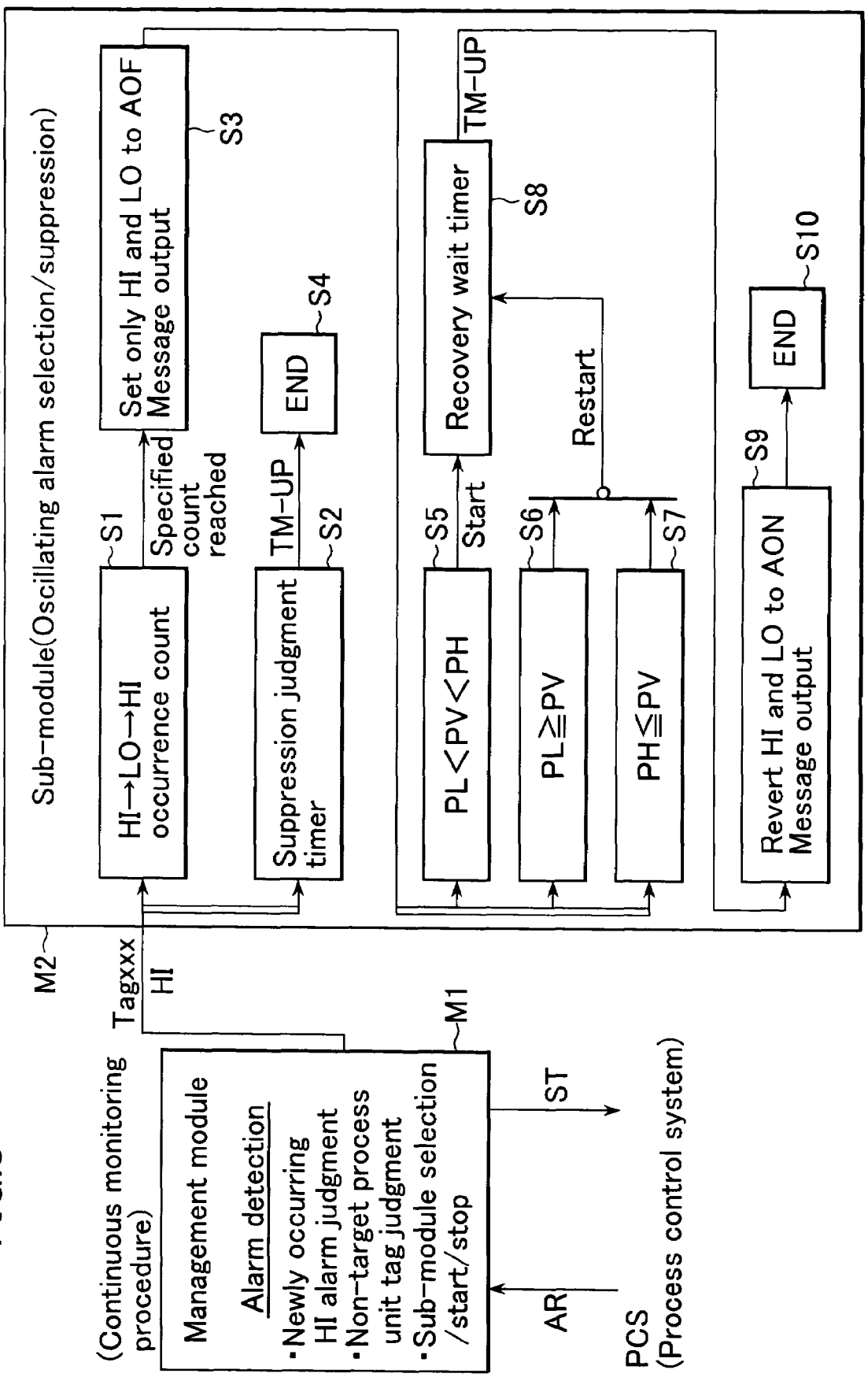
FIG. 8 is a functional flowchart illustrating a process of selecting and suppressing oscillating alarms.

FIG. 8 is the functional flowchart of modules for selecting and suppressing oscillating alarms. Symbol M1 denotes a management module, which is a function executed within alarm data management means 103. Upon detection of any alarm, management module M1 makes a judgment of tags with newly issued HI alarms, as well as a non-target process unit tag judgment, and selects/starts/stops sub-module M2.

Sub-module M2 is a function executed within oscillating alarm selection function 104c and alarm suppression means 105. The purpose of this function is to suppress an alarm that is issued when PV continues to oscillate greatly for a specific period due to insufficient tuning of control parameters for PID or other types of control and to prompt the operator to re-tune these parameters during suppression.

A decision to suppress alarms is made when HI-to-LO oscillation occurs a specified number of times within a given period. As suppression processing, sub-module M2 turns off the HI and LO alarms of the tag in question (prevents the alarms from being issued, which is hereinafter referred to as AOF) and causes a message to be output.

In the procedure of recovery processing, sub-module M2 turns on the alarm (cancels the AOF state, which is hereinafter referred to as AON) if a NR state (LO<PV<HI) lasts for a specific period after the alarm is set to AOF. This oscillating alarm is issued over and over again if the control parameters are not re-tuned within the specified suppression judgment period.

Figure 9:
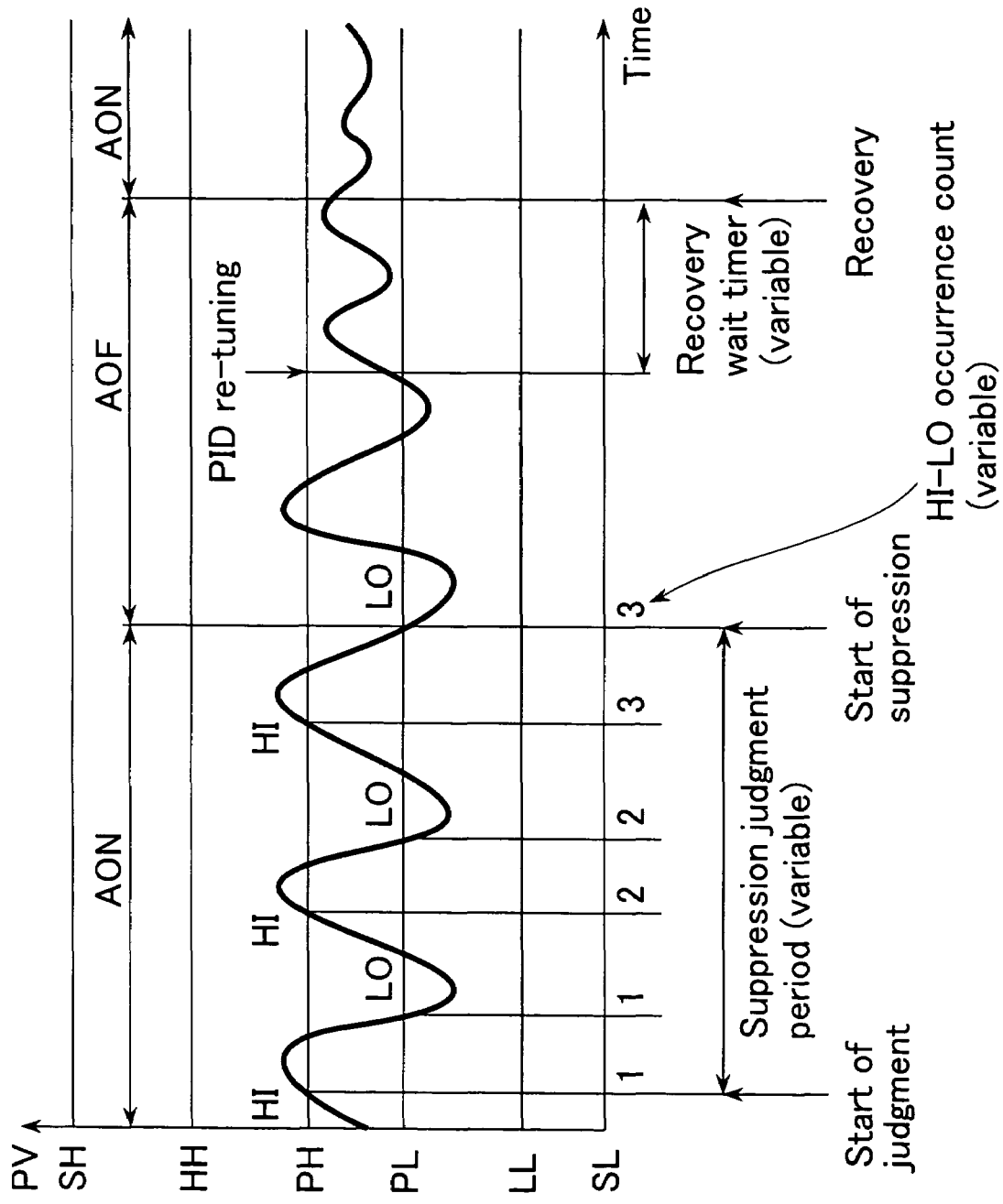
FIG. 9 is a waveform chart illustrating system behaviors according to the functional flowchart of FIG. 8.

The waveform chart of FIG. 9 illustrates the aforementioned method of manipulation for changing AOF to AON or vice versa. In the figure, AON is forcibly changed to AOF because a HI-to-LO oscillating alarm has been issued a specified number of times (three times in the figure) within the suppression judgment period. Since the condition "LO<PV<HI" has held true during the recovery wait period as the result of re-tuning that followed, the AOF state whereby the alarm was suppressed has been changed back to the original AON state.

Referring back to FIG. 8, the functional flowchart of sub-module M2 is explained. Upon receipt of a HI alarm from management module M1, the functions of S1 and S2 start concurrent processing. Step S1 counts the repetitions of the HI-LO-HI pattern of change. If a specified number of repetitions is reached, sub-module M2 notifies step S3 accordingly. Step S2 is a suppression judgment timer, which sends a TM-UP output to step S4 when a preset time expires, and ends processing. Step S4 detects that the HI alarm has changed to a LO alarm and notifies step S6 accordingly through the OR gate, and ends processing.

If the specified frequency of oscillation is reached during the suppression judgment period, step S3 sets HI and LO alarms to AOF and outputs a message, then passes the next process to steps S5 to S7 designed for concurrent processing. Step S5 checks PV after suppression processing and, if LO<PV<HI proves to be true as the result of parameter re-tuning, starts the recovery wait timer of step S8.

Steps S6 and S7 check whether PL≧PV and PH≦PV hold true and, if true, restart the recovery wait timer of step S8 through the OR gate. Recovery wait timer S8 sends a TM-UP output to step S9 when a preset time expires. The timer then sets HI and LO alarms back to AON from AOF and outputs a message, causing processing to end at step 10.

Figure 10:
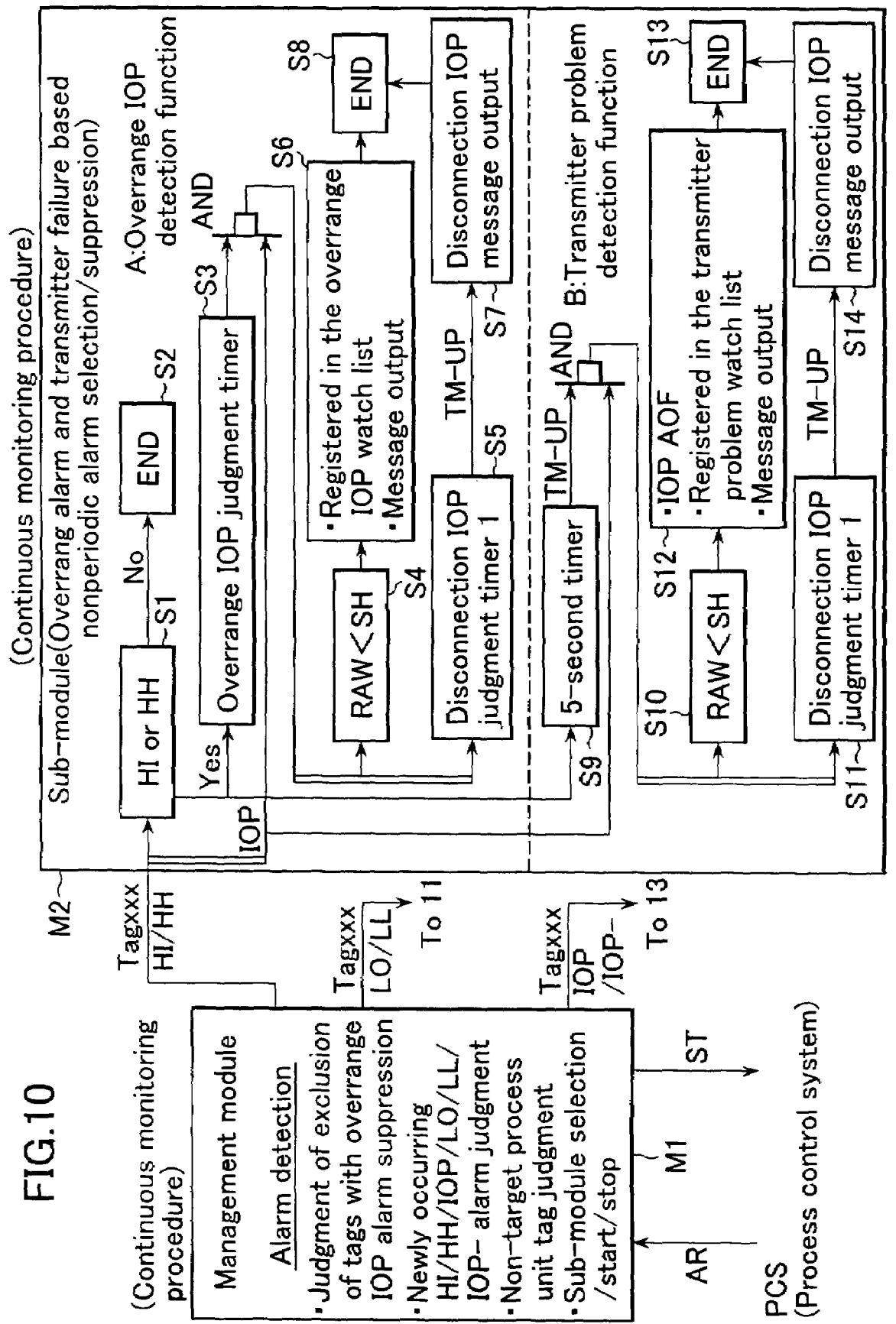
FIG. 10 is a functional flowchart illustrating a process of selecting and suppressing overrange alarms.

FIG. 10 is the functional flowchart of modules for selecting and suppressing overrange alarms and transmitter failure based nonperiodic alarms. M1 denotes a management module, which is executed within alarm data management means 103.

The range of a true process variable (hereinafter referred to as RAW) includes the Input Open levels (hereinafter represented by IOP on the positive side and IOP− on the negative side) beyond the SH and SL levels which are the upper and lower limits of a normal range.

The HH and LL limit-of-shutdown levels exist between the SH and SL levels, and the normal alarm setpoints of PH and PL are set at values smaller than HH and LL. An alarm in which the process variable exceeds the HH or LL level is hereinafter referred to as a HH or LL alarm, whereas an alarm in which the process variable exceeds the IOP or IOP− is hereinafter referred to as an IOP or IOP-alarm.

Management module M1 makes a judgment of exclusion of tags with overrange IOP alarm suppression discussed later, a judgment of tags with newly issued HI/HH/IOP/LO/LL/IOP− alarms, and a judgment of non-target process unit tags and selects/starts/stops sub-module M2.

Sub-module M2 is a function executed within overrange alarm selection function 104d and alarm suppression means 105. The purpose of this function is to monitor whether IOP/IOP− alarms have been issued and to identify overranged tags.

The conditions of judgment are that if an IOP alarm is issued when a specific time has elapsed after the issuance of a HI or HH alarm on the HI alarm side and a recovery is made automatically from the IOP alarm within a specific time, this IOP alarm is judged to be an overrange alarm. In addition, if the recovery is not made within the specific time, the IOP alarm is judged to be a disconnection IOP alarm.

As warning processing, sub-module M2 outputs a message prompting the operator to adjust the range of the transmitter for the tag in question. As IOP suppression processing, overranged tags are automatically registered in an IOP suppression watch list and subjected to constant monitoring. The listed tags are hereafter excluded from the selection of unnecessary alarms performed by this function.

Figure 11:
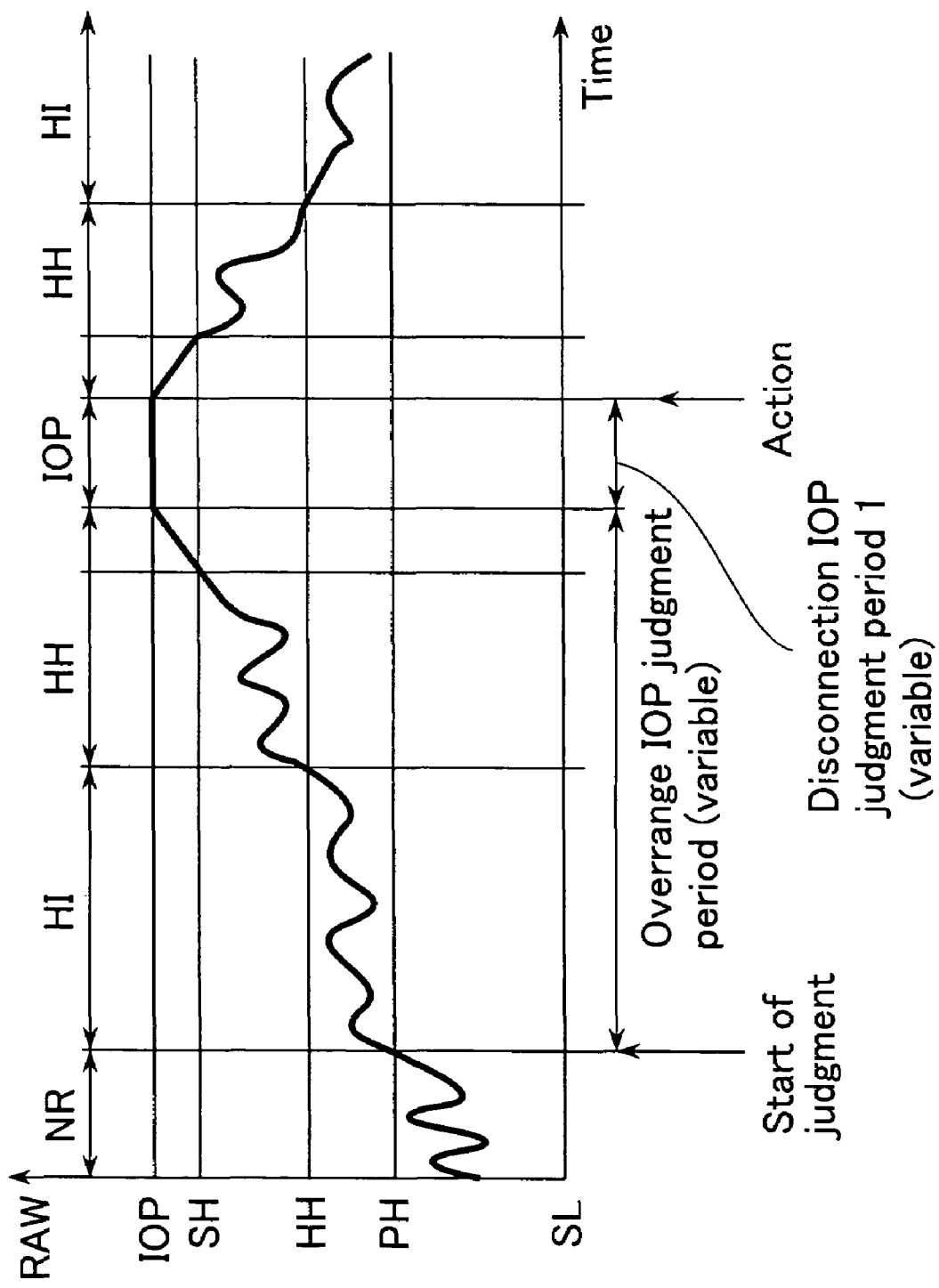
FIG. 11 is a waveform chart illustrating system behaviors according to the functional flowchart of FIG. 10.

FIG. 11 is a waveform chart explaining the relationship between changes in PV, overrange IOP judgment and disconnection IOP judgment.

If a HI alarm whose level is above PH but no higher than SH and a HH alarm whose level is above SH but no higher than IOP are issued within the overrange IOP judgment period, the process variable is judged to be under an overrange IOP alarm. In addition, if the IOP alarm remains active beyond the disconnection IOP judgment period, the IOP alarm is judged to be a disconnection IOP alarm.

Figure 12:
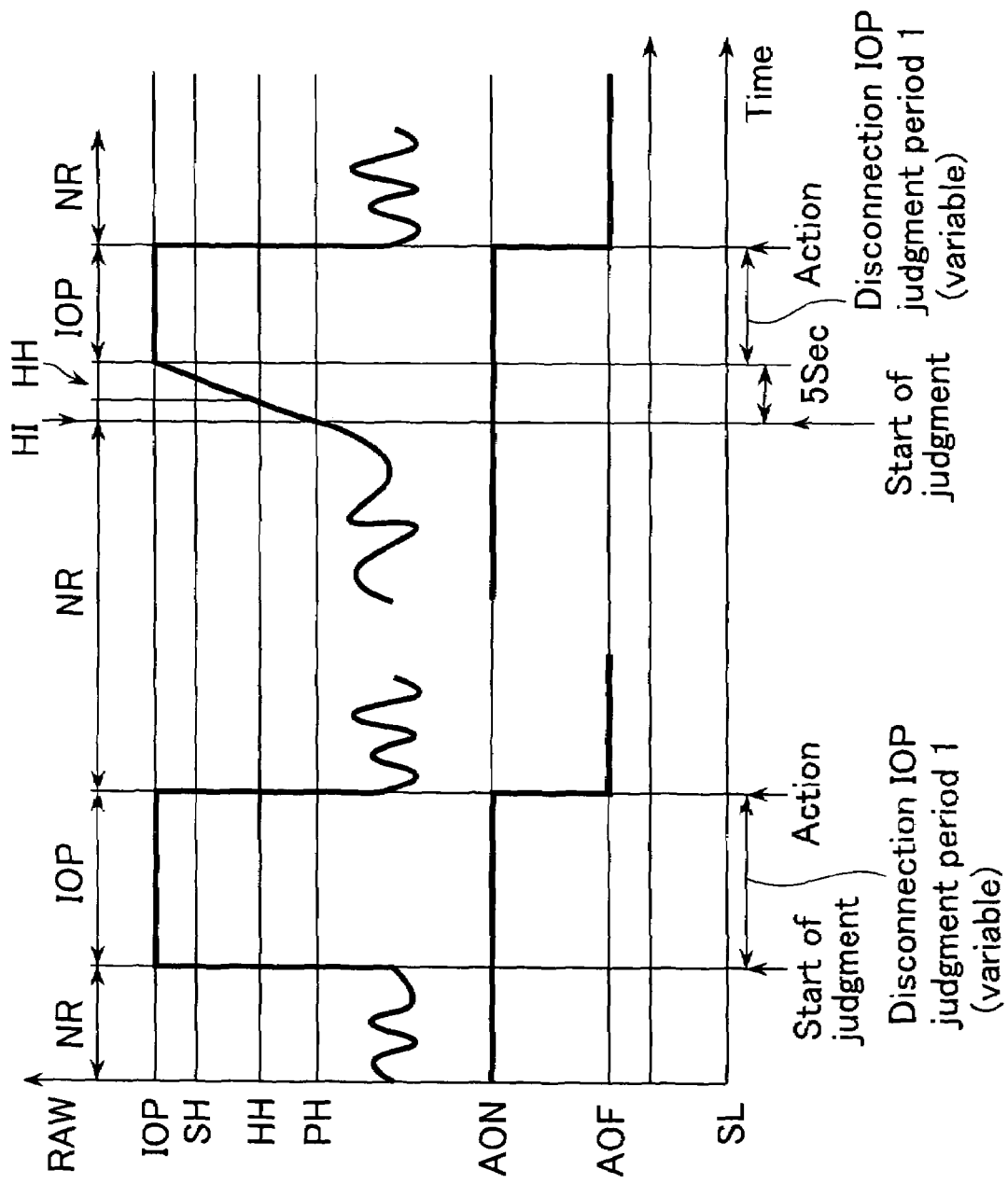
FIG. 12 is another waveform chart illustrating system behaviors according to the functional flowchart of FIG. 10.

FIG. 12 is a waveform chart explaining a suppression function against transmitter failure based IOP/IOP− alarms. The purpose of this function is to monitor whether IOP/IOP− alarms have been issued and to identify tags in a state of transmitter failure.

The conditions of judgment are explained with regard to the HI alarm side. If an IOP alarm is issued while there are no HI or HH alarms as shown to the left of FIG. 11, or the IOP alarm is issued within five seconds after a HI or HH alarm is issued as shown to the right of FIG. 12 and a recovery is made automatically from the IOP alarm within a specific time, the IOP alarm is judged to be a transmitter failure based IOP alarm. If the recovery is not made, the IOP alarm is judged to be a disconnection IOP failure.

Tags for which a transmitter failure has been detected are automatically registered in an IOP suppression watch list and the IOP alarm is set to AOF. The listed tags are hereafter excluded from the selection of unnecessary alarms performed by this function.

Referring back to FIG. 10, the functional flowchart of sub-module M2 is explained. The upper section marked A and separated by a dotted line (steps S1 to S8) refers to an overrange IOP detection function and the lower section marked B (steps S9 to S14) refers to a transmitter problem detection function.

Upon receipt of a HI or HH alarm from management module M1, step S1 in the section A checks whether the alarm is in the HI or HH status and, if the result is no, processing ends at step S2. If yes, the overrange IOP judgment timer of step S3 is started and a TM-UP output is sent out after the lapse of a specific time. If the AND conditions for the presence of any IOP alarm are satisfied, steps S4 and S5 designed for concurrent processing start.

Step S4 checks whether RAW<SH holds true and, if true, the IOP alarm is judged to be an overrange IOP alarm. The tag in question is then registered in the overrange IOP watch list in step S6, a message requesting review of the range is output, and processing ends at step S8.

Step S5 denotes a disconnection IOP judgment timer, which sends out a TM-UP output when a specific time lapses after the issuance of the IOP alarm, causing a disconnection IOP message to be output in step S7 and processing to be ended in step S8. In other words, the IOP alarm is judged to be an overrange IOP alarm if RAW<SH holds true within a specific time or is judged to be a disconnection IOP alarm if the IOP alarm lasts longer than five minutes.

Steps S9 to S14 in section B constitute the transmitter failure based nonperiodic IOP alarm suppression function. If the result of checking whether the alarm status is HI or HH proves to be yes in step S1, the 5-second timer of step S9 starts. If the timer sends out a TM-UP output and the AND conditions for the presence of any IOP alarm are satisfied, steps 10 and S11 designed for concurrent processing start.

Step S10 checks whether RAW<SH holds true and, if true, the IOP alarm is judged to be a transmitter failure based overrange IOP alarm. The IOP alarm is set to AOF in step S6. The tag in question is registered in the overrange IOP watch list, a message requesting to review the transmitter is output, and processing ends at step S13.

Step S11 denotes a disconnection IOP judgment timer, which sends a TM-UP output when a specific time elapses after the issuance of the IOP alarm, causing a disconnection IOP message to be output in step S14 and processing to be ended in step S13. In other words, the IOP alarm is judged to be a transmitter failure based overrange IOP alarm if RAW<SH holds true within a specific time or is judged to be a disconnection IOP alarm if the IOP alarm lasts longer than a specific time.

Figure 13:
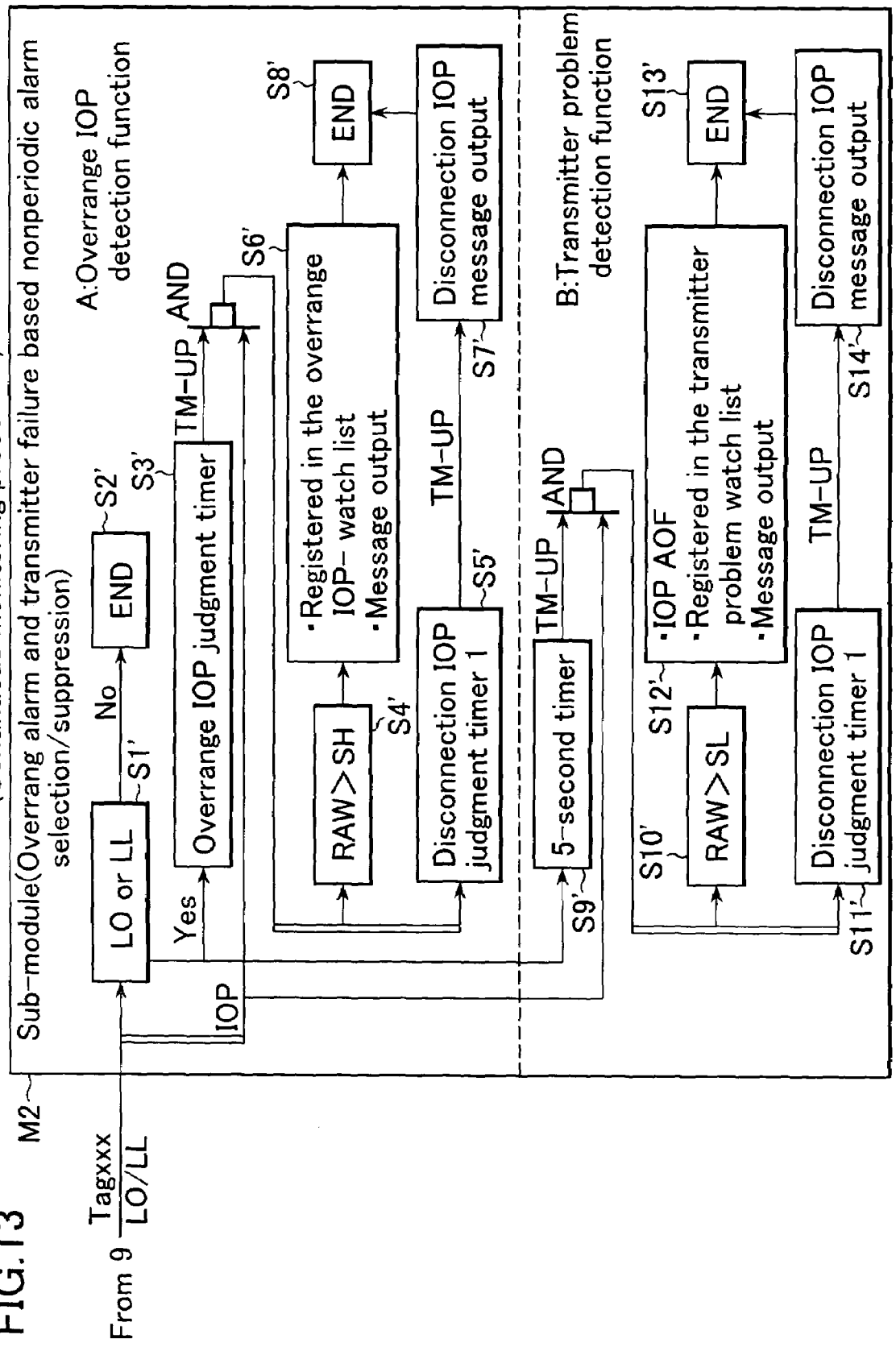
FIG. 13 is another functional flowchart illustrating a process of selecting and suppressing overrange alarms.

FIG. 13 is the functional flowchart of sub-module M2 when a LO/LL alarm is input from management module M1. Steps S1' to S14' correspond to, and are functionally identical with, steps S1 to S14 discussed in FIG. 10 and therefore are not explained here.

Figure 14:
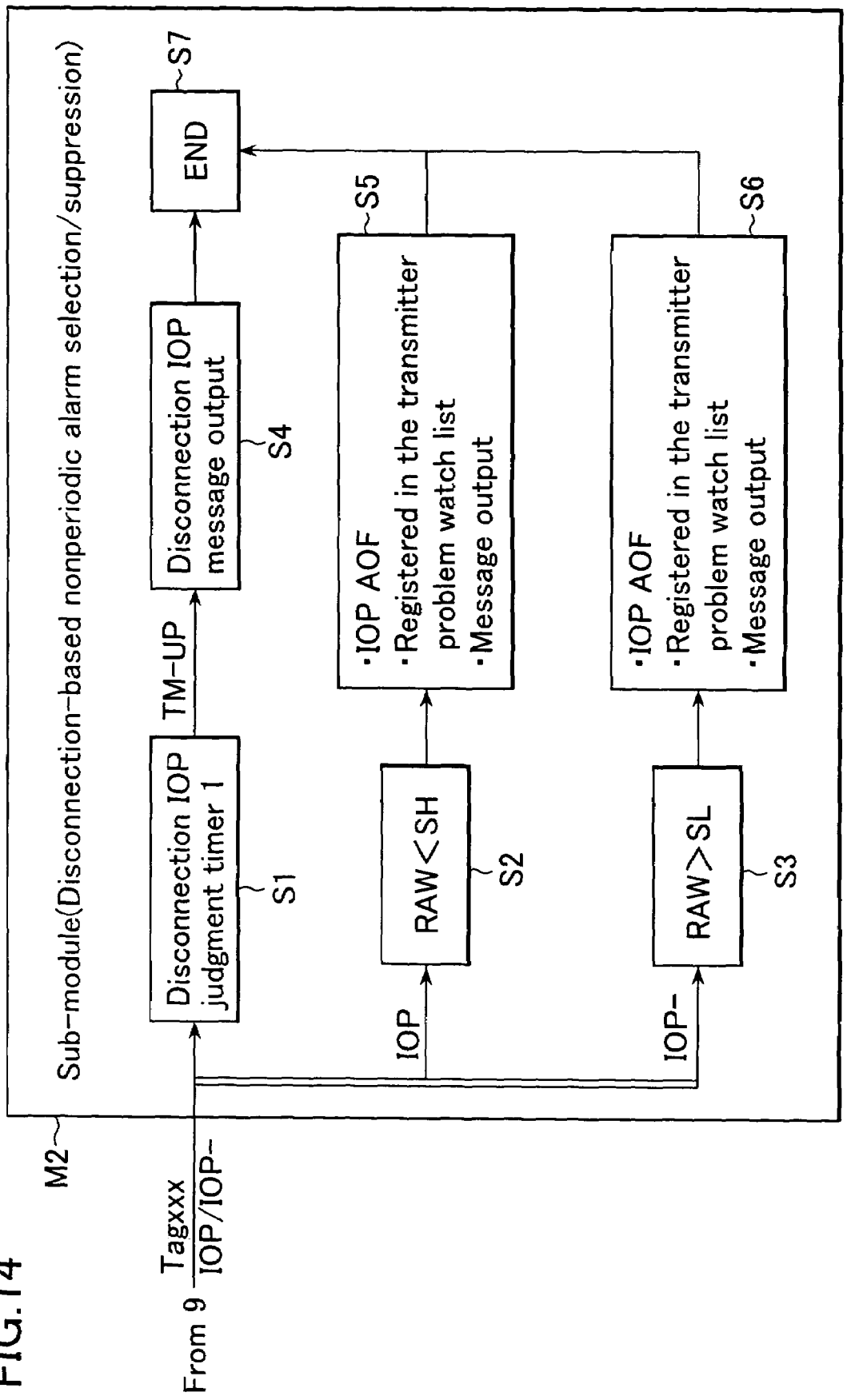
FIG. 14 is a functional flowchart illustrating a process of selecting and suppressing disconnection-based nonperiodic alarms.

FIG. 14 is the functional flowchart of sub-module M2 when an IOP/IOP− alarm is input from management module M1 shown in FIG. 10. This sub-module M2 is a function executed within disconnection-based nonperiodic alarm selection function 104e and alarm suppression means 105. The purpose of this function is to monitor whether any IOP/IOP− alarm has been issued and to identify tags in a state of disconnection to issue a warning.

The conditions of judgment, if explained with regard to IOP− alarms, are that if an IOP− alarm is issued while there are no LO or LL alarms and a recovery is not made from the IOP– alarm within a specific time, the IOP– alarm is judged to be a disconnection-based unnecessary alarm. As processing in this case, sub-module M2 causes a warning message to be output to request sensor replacement.

Figure 15:
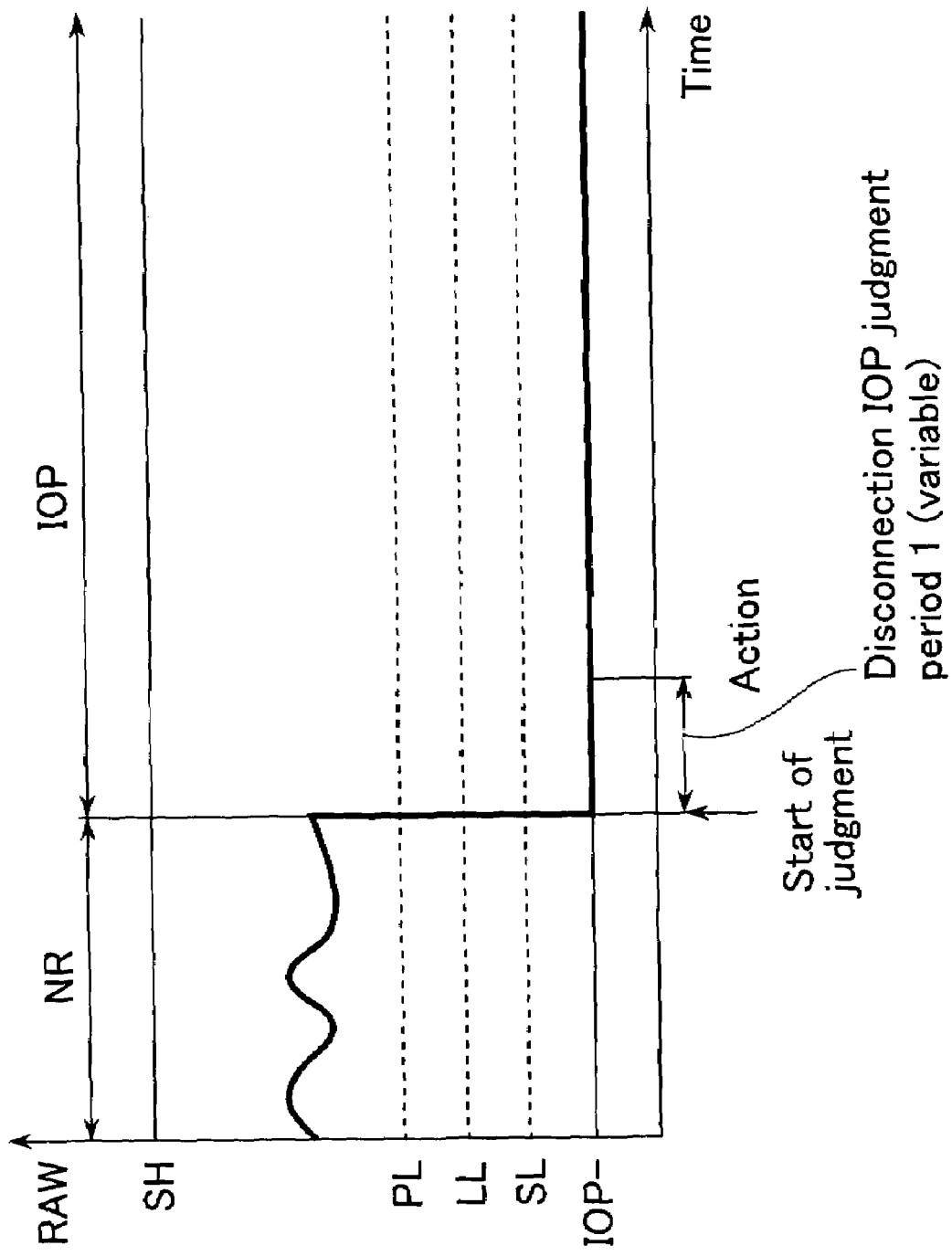
FIG. 15 is a waveform chart illustrating system behaviors according to the functional flowchart of FIG. 14.

FIG. 15 is a waveform chart explaining the aforementioned function in connection with IOP– alarms. Since an IOP– alarm is issued while there are no LO or LL alarms and remains active during the disconnection IOP judgment period from the start of judgment, this IOP– alarm is judged to be a disconnection-based unnecessary alarm.

Referring back to FIG. 14, the functional flowchart of sub-module M2 is explained. Upon receipt of an IOP/IOP– alarm from management module M1 discussed in FIG. 10, steps S1 to S3 designed for concurrent processing start. Step S1 denotes a disconnection IOP judgment timer, which sends out a TM-UP output if it continues timing until the point of timeout is reached, thus causing sub-module M2 to go to step S4, output a disconnection IOP message, and end processing at step S7.

Step S2 checks whether RAW<SH holds true for the IOP alarm and, if true, judges the IOP alarm to be due to a transmitter failure. Sub-module M2 then goes to step S5, sets the IOP alarm to AOF, registers the tag in question in a transmitter problem watch list, causes a message requesting transmitter maintenance to be output, and ends processing at step S7.

Step S3 checks whether RAW>SH holds true for the IOP– alarm and, if true, judges the IOP– alarm to be due to a transmitter failure. Sub-module M2 then goes to step S6, sets the IOP– alarm to AOF, registers the tag in question in a transmitter problem watch list, causes a message requesting transmitter maintenance to be output, and ends processing at step S7.

In other words, the IOP or IOP– alarm is judged to be a transmitter failure based IOP/IOP– alarm if RAW<SH or RAW>SL holds true before the disconnection IOP judgment timer expires from the point of alarm issuance, or judged to be a disconnection-based IOP/IOP– alarm if the IOP/IOP– alarm remains active.

Figure 16:
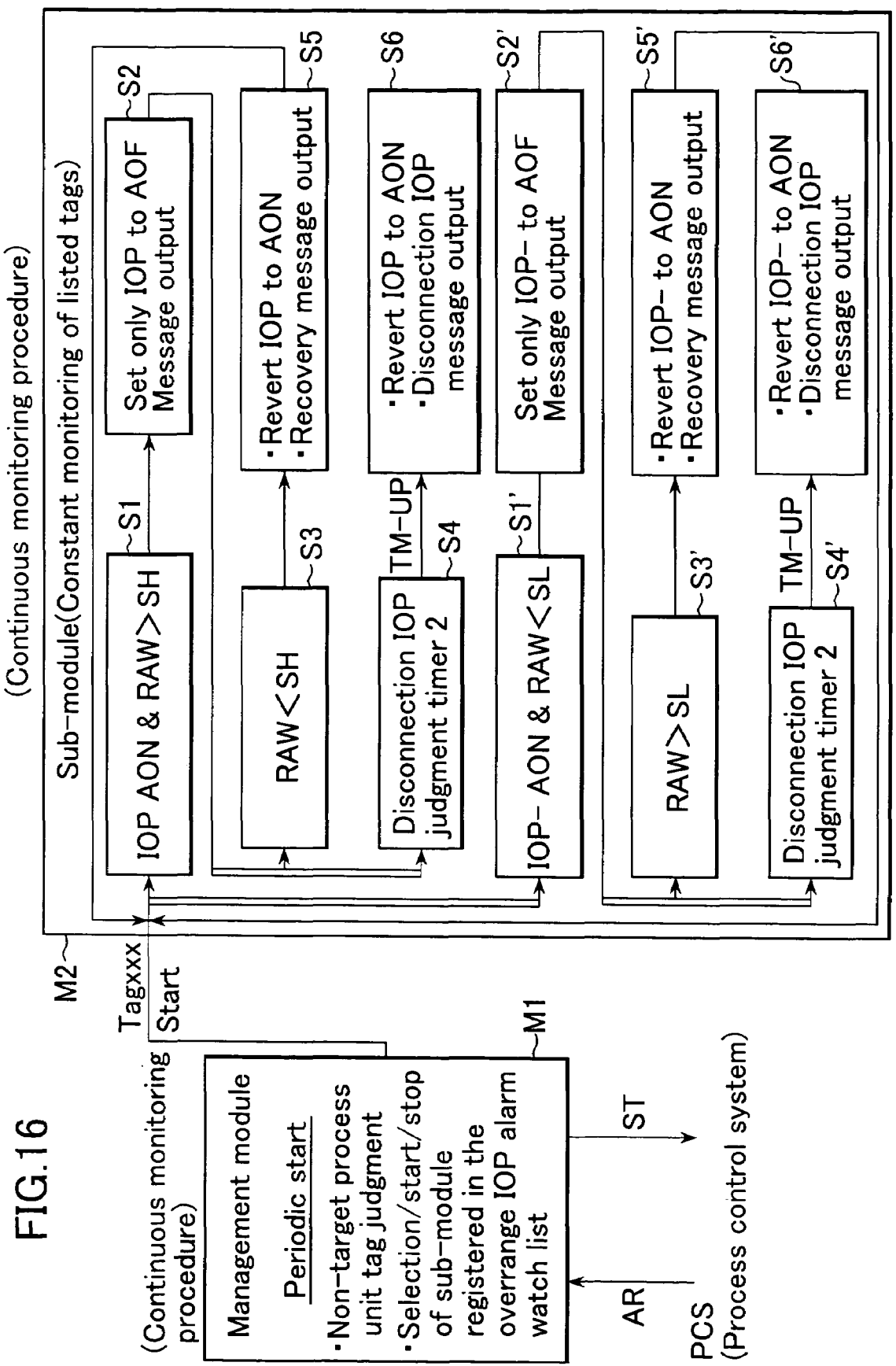
FIG. 16 is a functional flowchart illustrating a process of constantly monitoring listed tags.

FIG. 16 is the functional flowchart of modules for continuously monitoring tags registered in an overrange IOP (unimportant IOP alarms due to range failure or transmitter failure) watch list. M1 denotes a management module, which is a function executed within alarm data management means 103.

Management module M1 is started periodically, makes a non-target process unit tag judgment and a judgment of exclusion of tags with overrange IOP alarm suppression, and selects/starts/stops sub-module M2 for tags with newly occurring HI/HH/IOP/LO/LL/IOP– alarms.

Sub-module M2 is a function executed within constant monitoring function 104f and alarm suppression means 105. The purpose of this function is to suppress IOP/IOP– alarms due to overranging.

The start of suppression is effected by constantly comparing the RAW of a tag registered in the IOP watch list with the SH/SL thereof and by setting the IOP alarm to AOF when IOP=AON and RAW>SH, or by setting the IOP– alarm to AOF when IOP–=AON and RAW<SL, followed by message output.

The cancellation of suppression is effected by setting the IOP alarm to AON when IOP=AOF and RAW<SH, or by setting the IOP– alarm to AON when IOP–=AOF and RAW>SL, followed by recovery message output. If a recovery is not made from the IOP/IOP– alarm within a specific time frame, the alarm is judged to be due to disconnection and a message prompting the operator to take measures against the disconnection, such as sensor replacement, is output.

Figure 17:
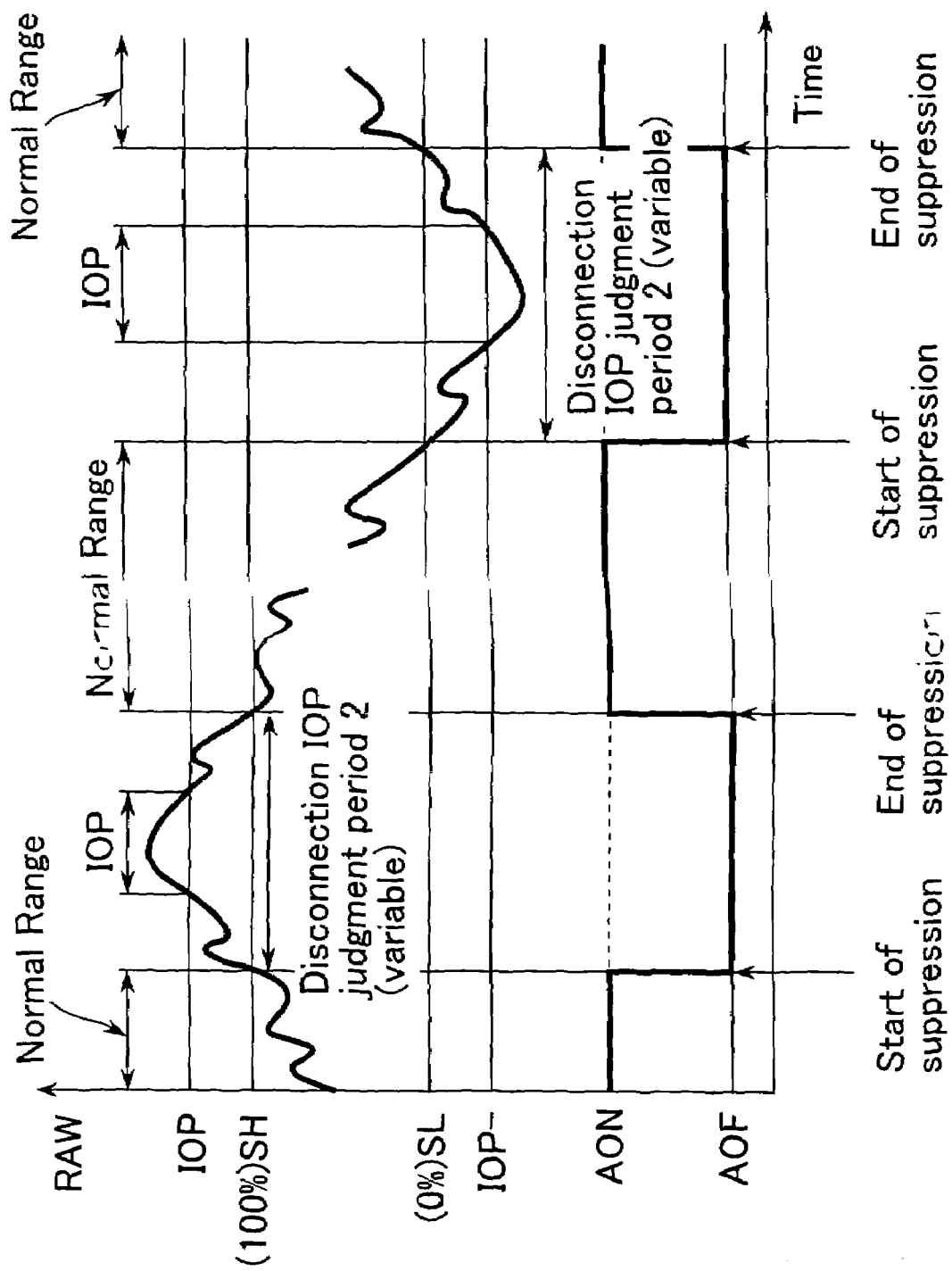
FIG. 17 is a waveform chart illustrating system behaviors according to the functional flowchart of FIG. 16.

FIG. 17 is a waveform chart explaining the aforementioned function in connection with continuous monitoring, where the IOP alarm is set to AOF from AON and thus suppressed when IOP=AON and RAW>SH, and is set back to AON if RAW<SH holds true within the period of disconnection judgment made by the disconnection IOP judgment timer. The function works in the same way on the IOP– alarm side.

Referring back to FIG. 16, the functional flowchart of sub-module M2 is explained. Upon receipt of a start command from management module M1, step S1 checks whether IOP=AON and RAW>SH hold true and, if true, sub-module M2 sets the IOP alarm alone to AOF and thus suppresses the alarm in step S2, causes a message to be output, and goes to steps S3 and S4 designed for concurrent processing.

In step S3, sub-module M2 checks whether RAW<SH holds true and, if true, sets the IOP alarm back to AON in step S5, causes a message to be output, and goes back to step S1. In step S4, the disconnection IOP judgment timer is started and, if the timer sends out a TM-UP output, the IOP alarm is judged to be due to disconnection. Sub-module M2 then sets the IOP alarm back to AON in step S6 and outputs a disconnection IOP message.

Steps S1' to S6' are the steps of processing on the IOP– alarm side and correspond to, and are functionally identical with, the steps of processing on the IOP alarm side and therefore are not explained here.

Management module M1 and sub-module M2 started up therefrom, which have been discussed in the embodiments described with reference to FIGS. 3 to 17, are realized using software-based functions implemented in a continuous monitoring procedure.

In the embodiment described with reference to FIG. 2, a system configuration is shown wherein alarm management server 100 is connected to the control bus of a hierarchical process control system to acquire alarm message data. Needless to say, however, the alarm management system is also applicable to non-hierarchical process control systems.

As is evident from the description given above, the following advantageous effects are provided according to the present invention.

(1) Since the system automatically selects and suppresses unnecessary alarms, the time-consuming engineering work of selecting unnecessary alarms is not needed, thus saving labor.

(2) The system has prescribed alarm selection algorithms, thus eliminating the need for engineers who have professional skills and experience necessary for identifying unnecessary alarms. As a result, unnecessary alarms can be precisely selected in a labor-saving environment.

(3) It is possible to provide the operator with only the truly necessary alarm information, thereby realizing even safer, more stable, and more efficient system operation.

What is claimed is:

1. An alarm management system for acquiring message data for alarms issued from a process and analyzing alarm behaviors, comprising:

alarm selection means for automatically selecting unnecessary alarms from said message data; and alarm suppression processing means for preventing said unnecessary alarms from being issued according to the results of selection by said alarm selection means.

2. The alarm management system of claim 1, wherein said alarm selection means selects repetitive alarms in which the result of judging a process variable is that a high-low-high pattern of change or a low-normal-low pattern of change is generated a specified number of times within a specified period.

3. The alarm management system of claim 2, wherein said alarm suppression processing means executes suppression processing for automatically increasing or decreasing the setpoints of said repetitive alarms by certain quantities when said repetitive alarms are selected, and causes a message requesting to review alarm setpoints to be output.

4. The alarm management system of claim 3, wherein said alarm suppression processing means cancels suppression processing if said alarm suppression processing means concludes, as the result of continued monitoring after said suppression processing, that said repetitive alarms are no longer issued.

5. The alarm management system of claim 1, wherein said alarm selection means selects overtime alarms in which the result of judging a process variable is that a high or low state lasts longer than a specified time.

6. The alarm management system of claim 5, wherein when said overtime alarm is selected, said alarm suppression processing means executes suppression processing for temporarily changing the setpoint of said overtime alarm to a value that causes said overtime alarm to become normal, and outputs a message requesting to review a hysteresis setpoint.

7. The alarm management system of claim 1, wherein said alarm selection means selects oscillating alarms in which the result of judging a process variable is that a high-low-high-low pattern of change is generated a specified number of times within a specified period.

8. The alarm management system of claim 7, wherein when said oscillating alarm is selected, said alarm suppression processing means executes suppression processing for forcibly turning off said oscillating alarm and outputs a message requesting to review the control parameter of a relevant tag.

9. The alarm management system of claim 8, wherein said alarm suppression processing means cancels suppression processing if said alarm suppression processing means concludes, as the result of continued monitoring after said suppression processing, that said oscillating alarms are no longer issued.

10. The alarm management system of claim 1, wherein said alarm selection means selects overrange alarms issued if a process variable increases or decreases beyond the range thereof.

11. The alarm management system of claim 10, wherein when said overrange alarm is selected, said alarm suppression processing means executes suppression processing for forcibly turning off said overrange alarm and outputs a message requesting to review the range of a relevant tag.

12. The alarm management system of claim 1, wherein said alarm selection means selects nonperiodic alarms issued if a process variable increases or decreases beyond the range thereof due to a temporary transmitter failure.

13. The alarm management system of claim 12, wherein when said nonperiodic alarm is selected, said alarm suppression processing means executes suppression processing for forcibly turning off said nonperiodic alarm and outputs a message requesting to perform transmitter maintenance for a relevant tag.

14. The alarm management system of claim 1, wherein said alarm selection means selects nonperiodic alarms issued if a process variable increases or decreases beyond the range thereof due to disconnection.

15. The alarm management system of claim 14, wherein when said nonperiodic alarm is selected, said alarm suppression processing means outputs a message requesting to perform transmitter maintenance for a relevant tag.

16. The alarm management system of claim 15, wherein tags for which alarms in which said process variable increases or decreases beyond the range thereof have been selected and suppression processing has been executed are registered in a watch list and the behaviors of said tags are periodically monitored.

17. The alarm management system of claim 1, wherein said alarm suppression processing means keeps the contents of suppression processing and message output on file as records.

18. The alarm management system of claim 1, wherein if said alarm suppression processing means changes any alarm setpoint and turns any alarm off or back on, said alarm suppression processing means outputs a message and keeps the contents of message output on file as records.

19. The alarm management system of claim 1, wherein the results of alarm selection by said alarm selection means and the contents of suppression processing by alarm suppression processing means are passed to a client computer connected through a general-purpose communication bus.

20. The alarm management system of claims 1, wherein said message data for alarms is acquired by a hierarchical process control system comprising host equipment and controllers for communicating with said host equipment to control field equipment.

* * * * *